(12) United States Patent
Cerea

(10) Patent No.: US 6,369,131 B1
(45) Date of Patent: Apr. 9, 2002

(54) DRY COLORING MASTER BATCH HAVING A HIGH PIGMENT CONTENT AND MANUFACTURING PROCESS

(75) Inventor: Giuseppina Cerea, Rozzano (IT)

(73) Assignee: Geoline S.r.l., Rozzano (IT)

( * ) Notice: Subject to any disclaimer, the term of this patent is extended or adjusted under 35 U.S.C. 154(b) by 0 days.

(21) Appl. No.: 09/281,914

(22) Filed: Mar. 31, 1999

(30) Foreign Application Priority Data

Apr. 1, 1998 (IT) .......................................... MI98A0701

(51) Int. Cl.⁷ .................................................. C08K 7/16
(52) U.S. Cl. ........................................ 523/223; 523/357
(58) Field of Search .................................. 523/223, 357

(56) References Cited

U.S. PATENT DOCUMENTS

| | | |
|---|---|---|
| 3,844,806 A | 10/1974 | Wegmann et al. |
| 4,191,680 A | 3/1980 | Kirner et al. |
| 4,713,411 A | 12/1987 | Kazuo et al. |
| 4,900,647 A * | 2/1990 | Hikake et al. .............. 430/137 |
| 5,936,021 A * | 8/1999 | Bryant et al. ............... 524/430 |

FOREIGN PATENT DOCUMENTS

| | | |
|---|---|---|
| GB | 1347346 A | 2/1974 |
| GB | 2275930 A | 9/1994 |

* cited by examiner

*Primary Examiner*—Kriellion Sanders
(74) *Attorney, Agent, or Firm*—Sughrue, Mion, Zinn, Macpeak & Seas, PLLC

(57) ABSTRACT

Dry master batch comprising at least one pigment and a dispersion carrier, characterized in that it contains at least 80% by weight calculated on the weight of the mixture of particles of pigment dispersed in said carrier; it can be prepared by means of a process that comprises the steps of feeding a flow of pigment obtained from a process of synthesis in aqueous or organic phase in the form of a filter pressed, tape pressed or centrifuged wet cake and a flow of a solution of a dispersant carrier in a turbo-mixer, centrifuging such flows against the inner wall of said turbo-mixer, with the formation of a dye paste arranged in a thin and dynamic layer; drying the dye paste obtaining said dry master batch, which is particularly suited for the preparation of inks and paints or for the pigmentation of plastic materials.

41 Claims, 1 Drawing Sheet

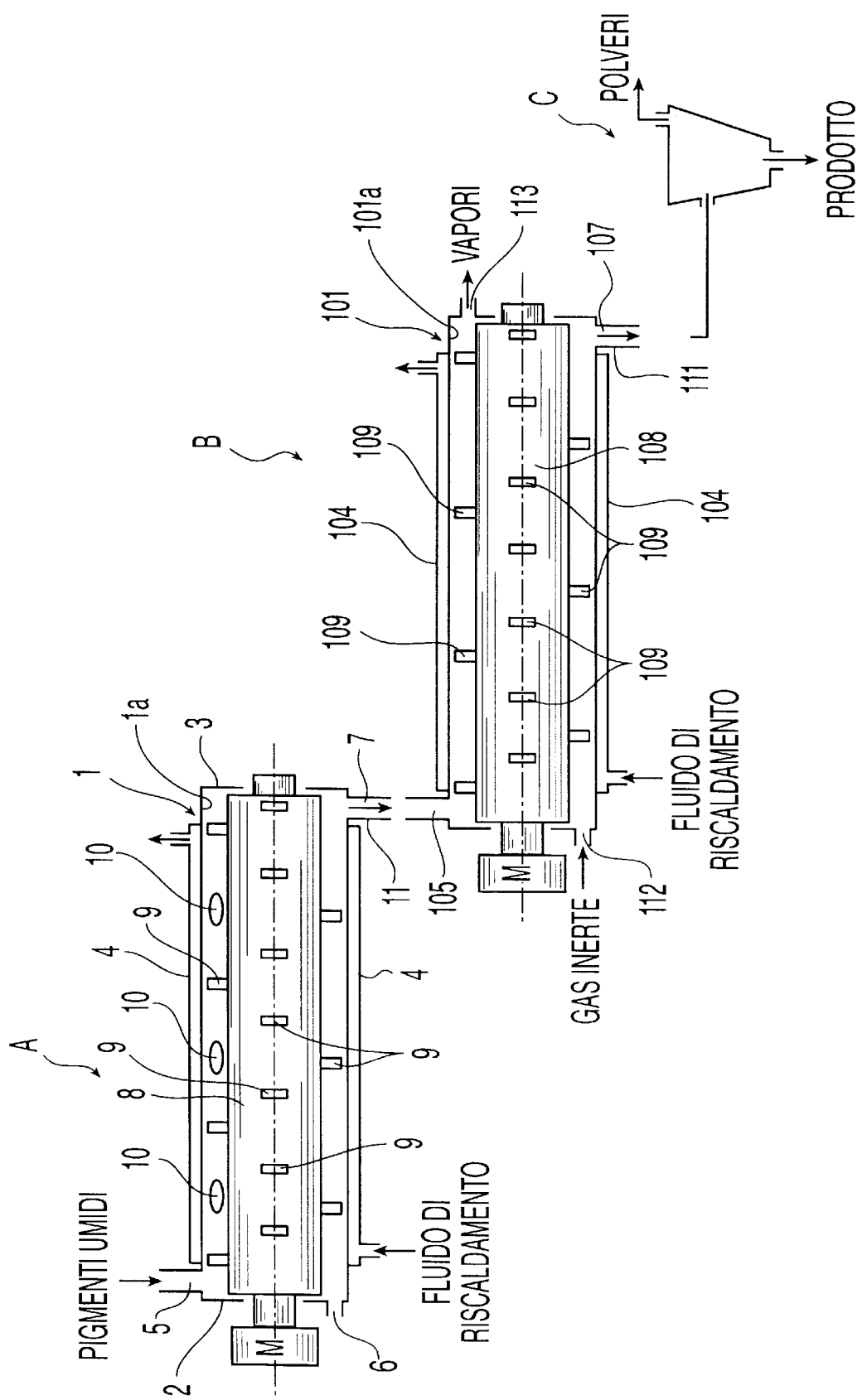

DRY COLORING MASTER BATCH HAVING A HIGH PIGMENT CONTENT AND MANUFACTURING PROCESS

FIELD OF APPLICATION

In its broadest aspect, the present invention relates to the treatment of ingredients choosen in the group of pigments, anti-flame agents, UV and temperature stabilizers, vulcanizing agents, reticulating agents, initiators, viscosity modifiers, anti-flocculating agents and the like and mixtures of the same pigments or agents in order to promote their incorporation in final application carriers.

In particular, the present invention relates to dry master batches with high content of pigments, specifically suited for the preparation of inks and paints or for the pigmentation of plastic materials.

The present invention relates also to a process for the preparation of said master batches.

The term "pigments" is meant to include also the so called optical bleaching agents, that is to say those organic or inorganic materials able to bleach, i.e. to turn the substrate whiter, with which they come in contact, and flame retardants.

It is known that inks and paints may be prepared by mixing while stirring the pigments with suitable, in general resin-based, dispersion carriers, able to disperse effectively the pigments particles so to obtain the end product with the desired dye and gloss properties.

It is also known that, in order to obtain paints or inks with good dye and gloss properties, the size of the pigment particles must be sufficiently reduced, generally below 1 $\mu$m. In case of organic pigments, particles of such granulometry may be obtained from synthesis processes in aqueous phase. Such particles are separated from the reaction mixture by means of filtration under pressure, thus obtaining cakes which are then dried.

During the drying, the pigment particles undergo a fast agglomeration that increases the granulometry to values greater than 1 $\mu$m, so that it is necessary to grind those particles in order to restore the desired granulometry, during the incorporation in the final dispersion carrier in dedicated equipment, such as sand mills, ball mills and alike.

In order to avoid the milling process, according to a method proposed in the prior art, the still wet filter pressed cakes are mixed, in a vacuum kneading machine and at a predetermined temperature, with resin solutions, such as solutions of glycerophthalic resins, in suitable organic solvents.

As pigments generally have a greater affinity for such solvents, the pigment particles dissolve before the agglomeration takes place and at the same time the particles are freed from the water of the cakes, which is removed from the mixture by the combined effect of vacuum and heating.

By exposing such mixture while stirring to vacuum and heating for a long period of time, the organic solvents are slowly removed and the pigment particles are dispersed in the resins devoided of such solvents.

At the end of the process, dried master batches are obtained, wherein the granulometry of th e dispersed particles of the pigments is substantially unchanged with respect to that initially provided on the filter pressed cake, so that such mixtures can be added to a final dispersion carrier without any milling being required.

The aforesaid process has the drawback that master batches with the aforesaid characteristics may be obtained, only if the pigments weight percentage in the final mixtures does not exceed 30%.

The high resin content of such mixtures strongly limits their compatibility with the final dispersion carriers up to a point where, in order to have an effective dispersion of the pigments therein, it is often necessary to employ in the dispersion carriers, the same resins used in the master batches.

As result, the master batches prepared with the aforesaid process find applicability in a rather limited field.

The technical problem at the basis of the present invention is that of providing dry master batches comprising pigments and dispersion carriers wherein the main component of the mixture consists of particles of such pigments of a proper granulometry, wherein said mixtures can be in turn dispersed without the need of milling them in various final carriers with different chemical-physical properties, carriers which range from the dispersion carriers employed for the preparation of inks and paints to plastic materials.

Such problem is solved by a dry master batch comprising at least one pigment and a dispersion carrier, characterized by comprising at least 80% in weight calculated on the weight of the mixture of particles of said at least one pigment having a granulometry lower than 1 $\mu$m dispersed in said carrier.

Preferably, the master batches of this invention comprise at least 90% of pigment particles dispersed in the dispersion carrier.

The pigments of the master batches of this invention can be obtained through synthesis processes in aqueous or organic phase.

The dispersion carrier is chosen according to the final application of the mixtures of the invention. The mixtures may be advantageously employed both for the preparation of inks and paints and for the pigmentation of plastic materials.

When the master batches are employed for the preparation of inks and paints, the dispersion carrier for the mixtures may consist of one or more resins chosen in the group comprising glycerophthalic resins and derivatives thereof, polyamide resins, polyvinyl alcohols, colophonies and mixtures thereof, which have a good compatibility with various resins of the end dispersion carriers such as maleic resins, ketonic resins, phenol-formaldehyde resins cerophthalic resins, esterified arabics, colophonies or hydrogenated colophonies.

On the contrary, when the master batches are used for the pigmentation of plastic materials, the dispersion carrier can consist of one or more polyolefins and the mixtures may be used for the pigmentation of plastic materials consisting of styrene, vinyl, polyolefin, polyurethane polymers and block copolymers.

The dry master batches according to the present invention are produced with a process comprising the steps of:

providing a turbo-mixer comprising a cylindrical tubular body, provided in some case with a heating jacket on the inner wall thereof, with at least one inlet opening for at least one pigment in form of filter pressed, tape pressed or centrifuged wet cake (that is to say, impregnated with water or organic solvents according to the synthesis process for the pigments), with at least one inlet opening for a solution of a dispersion carrier, at least one discharge opening and one rotor provided with blades rotatably supported in the cylindrical body and having the blades arranged helicoidally;

feeding continuously and concurrently a flow of said at least one pigment and a flow of solution of said dispersion carrier in the turbo-mixer;

centrifuging said flows by means of said rotor provided with blades against the inner wall of said turbo-mixer, with the formation of a dye paste arranged in a thin tubular, turbulent and dynamic layer that is advanced by the blades of said rotor towards said at least one discharge opening of said turbo-mixer, said blades subjecting to a severe mechanical machining the dye paste of said thin tubular, turbulent and dynamic layer;

discharging in continuously a flow of said dye paste from said at least one discharge opening of said turbo-mixer; and drying said dye paste obtaining said dry master batch.

In the process according to the invention, the rotor provided with blades of said turbo-mixer is made to rotate at a speed of 200–1000 rpm and said heating jacket is maintained at a temperature comprised between 20° C. and 60° C.

In the turbo-mixer, the aforesaid at least one inlet opening for the solution of dispersion carrier can consist of a feed opening for said solution or of distributing nozzles for said solution or of both.

It has surprisingly been found that, processing dye pastes in the form of a thin tubular, turbulent and dynamic layer according to the process of the present invention, dry master batches may be obtained, which have a high pigment content in excess of 80% by weight calculated on the weight of the final master batch, wherein the pigment particles are uniformly dispersed in the carriers used for the dispersion and maintain their original granulometry.

The master batches obtained by means of the process of the present invention, have therefore the form of beads consisting of pigment particles coated with a film of dispersion carrier.

Further, they are dry, in that they are obtained with a reduced content of water, that varies from 1% to 5%.

The master batches obtained by means of the process can be dispersed in various final carriers for specific applications, that range from dispersion carriers for the preparation of inks and paints to plastic materials for the pigmentation of the plastics themselves, without any milling process being required during the application.

Further, the mixtures of the present invention have advantageously a wider field of application than the mixtures of the prior art since, as a result of the reduced content of dispersion carrier, their compatibility with final carriers for specific applications is almost independent of the chemical-physical properties of the dispersion carrier being used.

In the process according to the invention, the dispersion carrier of the particles of pigment varies as mentioned above according to the final application of the master batches and can be chosen from the group comprising glycerophthalic resins and derivatives thereof, polyamide resins, polyvinyl alcohols, colophonies and mixtures thereof.

The solvents used for preparing the solutions of the dispersion carriers are organic solvents which can solvate the pigment particles avoiding their agglomeration and, in case of pigments obtained from synthesis in water phase, are able at the same time to remove therefrom the remaining water, which is removed together with said solvents in the drying step. Such removal occurs through intimate contact between the particles and the solvents.

The aforesaid solvents can be chosen from the group comprising alcohols, ketones, esters, aliphatic hydrocarbons, aromatic hydrocarbons and mixtures thereof.

In the process according to the invention, the drying of the dye paste comprising the pigments and the dispersion carrier is carried out at a controlled temperature equal to 80–240° C. by means of conventional fluidized bed dryers or preferably by means of a turbo-dryer produced by the Applicant themselves operating at the aforementioned temperatures.

Both the fluidized bed dryers and the turbo-dryers of the Applicant guarantee a better homogeneity of heating to the dye paste to be dried than normal conventional dryers and avoid the occurrence of sagging phenomena of the dispersion carriers during the drying.

Preferably, the drying step of the process according to the present invention is carried out in presence of an inert gas flow, for example nitrogen at the temperature of 120–240° C. in order to avoid the occurrence of oxidation processes on the dye paste to be dried with ensuing change of the characteristics of the final product.

Conveniently, the drying step can be carried out in a turbo-dryer which is structurally analogous to the turbo-mixer previously described, from which it differs as far as some specific features are concerned. These features will be described in the following and are included in order to operate as dryer.

The turbo-dryer comprises a cylindrical tubular body equipped with a heating jacket in the inner wall thereof, with at least one inlet opening for said dye paste, with at least one discharge opening for said master batch at least one discharge opening for the vapours generated by the drying and a rotor provided with blades, rotatably supported in the cylindrical body and with blades orientated to make the dye paste advance from said at least one inlet opening to said at least one discharge opening.

A fan to intake the vapours that are released during the drying and in case a condenser to condense such vapours and thus recover a mixture of solvents is connected to the turbo-dryer.

The turbo-dryer may case comprise at least one inlet opening for an inert gas, preferably nitrogen.

According to such embodiment, the drying step of the process according to the invention comprises the steps of:

feeding in continuously a flow of dye paste in outlet from said turbo-mixer in the aforesaid turbo-dryer, wherein the inner wall is maintained at a temperature of 80–240° C. and wherein the rotor provided with blades is made to rotate at a speed of 200–1000 rpm;

centrifuging said dye paste inside said turbo-dryer with formation since its inlet in said turbo-dryer of a thin tubular, turbulent and dynamic layer that is made advance by the blades of the rotor of said turbo-dryer towards said at least one discharge opening thereof, in heat exchange relationship with the inner wall of said turbo-dryer, said blades subjecting to a severe mechanical machining said dye paste of said thin tubular, turbulent and dynamic layer;

contemporaneously intaking the vapours that are released from said dye paste; and discharging in continuous a flow of a dry master batch.

According to a feature of the drying step of the process of the present invention, a flow of an inert gas, preferably nitrogen at the temperature of 120–240° C. is fed into the turbo-dryer contemporaneously and in concurrently with the flow of said dye paste to be dried.

According to a further feature of the drying step of the process of the present invention, the vapours intaken by the turbo-dryer are condensed in a dedicated condenser connected to said turbo-dryer in such a way to recover a mixture of solvents, thus realizing a closed circuit.

According to another feature, the process of the invention can further comprise a step of removal of the fine dusts on the final product to be carried out in a dust remover, such as for example a cyclone.

Features and advantages of the present invention will appear more clearly from the following indicative and non limitative description of an embodiment of process for the production of dry master batches, made with reference to the attached drawing, wherein an apparatus for carrying out said process is schematically represented.

With reference to the aforesaid figure, an apparatus used for carrying out the process of this invention comprises essentially of a turbo-mixer A, a turbo-dryer B and a cyclone C.

The aforesaid turbo-mixer and turbo-dryer have many common structural members; therefore, for sake of ease, only the turbo-mixer will be described in details.

In the above mentioned figure the structural members of the turbo-dryer B will be indicated with the same numerals used for corresponding members of the turbo-mixer A increased by 100.

The turbo-mixer A comprises a tubular cylindrical body 1, arranged with a longitudinal horizontal axis and closed at opposite ends by bottoms 2, 3, coaxially equipped with a heating jacket 4 intended for being passed through by a diathermic fluid or by a fluid of a different kind, in order to maintain the inner wall of said body 1 at a predetermined temperature.

The tubular body 1 is equipped with an inlet opening 5 for instance for wet pigments which are generally in the form of filter pressed, tape pressed or centrifuged cakes and with a discharge opening 7 of the dye paste comprising such pigments and a dispersion carrier. This discharge opening 7 is in communication with the inlet opening 105 of the turbo-dryer B by means of a duct 11 and receives the flow of the aforesaid paste. A rotor 8 provided with blades is rotatably supported in the tubular body 1; the blades 9 thereof are arranged helicoidally and are oriented so to centrifuge and contemporaneously convey said dye paste towards the discharge opening 7.

A motor M is foreseen for driving the rotor 8 at a speed comprised between 200 and 1000 rpm.

The tubular body 1 further comprises a port 6 and a series of nozzles 10 in order to feed inside said tubular body 1 a solution of a dispersion carrier.

In order to guarantee a good operation and a constant production, turbo-mixers realized by the Applicant themselves have been found as particularly reliable.

According to the process of this invention, of flow a wet pigments obtained from processes of synthesis in aqueous phase or organic phase in the form of filter pressed, tape pressed or centrifuged cakes is fed in continuously into the turbo-mixer A through the inlet opening 5 and immediately taken and mechanically machined by the blades 9 of rotor 8, whose rotational speed is maintained at a suitable value.

Contemporaneously, a solution of dispersion carrier is fed through the port 6 and the nozzles 10 into the tubular body 1.

Therefore, the blades 9 of the rotor 8 provide for the centrifugation of the dye paste which is produced by the mixing of the pigments with the solution of dispersion carrier against the inner wall 1a of the turbo-mixer 1, thus forming with said paste a thin tubular layer, from the very beginning of its formation inside the turbo-mixer A. Said thin tubular layer is turbulent and dynamic, in that it is forced by the blades 9 of rotor 8 towards the discharge opening 7.

Whilst said thin tubular and dynamic layer flows in contact with the wall 1a of the turbo-mixer in heat exchange relationship therewith, the dye paste that forms it, is continuously mechanically machined by the blades 9 of rotor 8 that maintain it in a state of thorough and homogeneous mixing.

This guarantees an effective and uniform dispersion of the pigments of the dye paste, thus preventing possible agglomerations of particles to occur, so that the particles maintain their granulometry unchanged.

The flow of said dye paste from the discharge opening 7 of the turbo-mixer A passes through the turbo-dryer B through the inlet opening 105.

Contemporaneously and concurrently with the flow of dye paste in the turbo-mixer B, a continuous flow of nitrogen is fed through the inlet opening 112, at a temperature of 120–240° C. and at a flow rate of 400–600 $m^3$/hr.

Therefore, the blades 109 of rotor 108 centrifuge the dye paste in outlet from the turbo-mixer A against the inner wall 101a, maintained at a predetermined temperature by a diathermic fluid or by another fluid that flows inside the heating jacket 104 in the turbo-dryer B, forming with such paste, since its entry into the turbo-dryer, a thin tubular, turbulent and dynamic layer. Such layer is forced by the blades 109 of rotor 108 towards the discharge opening 107.

Whilst said thin tubular, turbulent and dynamic layer flows in contact with the wall 101a of the turbo-dryer B in heat exchange relationship therewith, the dye paste that forms it, is continuously mechanically machined by the blades 109 of rotor 108 that keep such paste in a state of thorough and homogeneous mixing.

In this way the thin layer of said dye paste is dried and beads of master batches consisting of pigment particles coated with a film of carrier are formed.

The granulometry of the pigment particles inside the beads is substantially unchanged with respect to the initial one.

The vapours that are released by the drying of the dye paste are intaken by a fan (not shown) connected to the turbo-dryer B and exit from said turbo-dryer through the opening 113 of the cylindrical tubular body 101.

Hence, the finished product is discharged from the turbo-dryer B through the discharge opening 107 and delivered through a duct 111 into the cyclone C in order to separate the fine dusts from the finished product.

In the process according to the invention, the respective temperature of the wall 1a of the turbo-mixer A and of the inner wall 101a of the turbo-dryer B, the rotational speed of the rotor provided with blades of the turbo-mixer A and of the turbo-dryer B, respectively, are chosen so to obtain dry master batches with a high content of pigments dispersed by a dispersion carrier, which may be in turn dispersed in various final carriers for specific applications.

So, for example, feeding into the turbo-mixer A with a flow rate of 100 kg/hr filter pressed, tape pressed or centrifuged, wet cakes containing 50% in weight of pigments having particles of granulometry lower than 1 $\mu$m, and a flow rate of 10 kg/hr of solution containing 55% by weight of dispersion carriers, respective wall temperatures from 20 to 60° C. for the turbo-mixer A and from 80 to 240° C. for the turbo-dryer B and a rotational speed of the rotors provided with blades of turbo-mixer A and of turbo-dryer B in the range from 200–1000 rpm have been found particularly advantageous.

Obviously, for technical and specific reasons, the above described turbo-mixer and turbo-dryer may be equipped with one or more inlet and/or discharge openings and with one or more jackets respectively of heating and cooling for producing a temperature gradient and thus for obtaining a heat exchange finalised to specific requirements.

EXAMPLE 1

Preparation of a Dry Master Batch Suited for the Production of Inks

By means of the above described apparatus and following the process of the present invention, still wet, filter pressed cakes containing 50% by weight of Red 57:1 nr. 15850:1 (calcium salts) pigment were fed in continuous into the turbo-mixer A with a flow rate of 100 kg/hr.

The wall temperature of the turbo-mixer was controlled to be around 30° C. and the speed of the rotor provided with blades was constantly at 800 rpm.

Contemporaneously, a previously prepared solution containing 55% by weight of polyamide resin Nylon 6 with softening point of 170–180° C., dissolved in a 1:1 mixture of ethanol/toluol was fed inside the turbo-mixer A through the nozzles 10 and the port 6.

After a residence time in the turbo-mixer A of about 5 minutes, the dye paste which had formed in such turbo-mixer was fed continuously into the turbo-dryer B, wherein the wall temperature was controlled to be around 130° C. and the rotational speed of the rotor was maintained at 800 rpm.

In the turbo-dryer B, further on, a continuous flow of nitrogen at a flow rate of 500 $m^3/h$ and at the temperature of 150° C. was fed concurrently with the flow of said dye paste and the vapours generated by drying were intaken together with nitrogen by means of a fan connected to the turbo-dryer B.

After a residence time in the turbo-dryer B of about 3 minutes, a master batch in the form of beads was discharged containing 90% by weight of the aforesaid pigment dispersed in the polyamide resin, that was sent to the cyclone C in order to be separated from the fine dusts.

The aforesaid mixture had a water content equal to 1% and, without requiring any milling, had a high dispersibility in various final dispersion carriers, used for the preparation of inks containing maleic resins, ketone based resins, phenol resins, glycerophthalic resins, esterified arabics, colophonies and hydrogenated colophonies, showing a very good compatibility with such resins.

EXAMPLE 2

Preparation of a Dry Master Batch Suited for the Production of Plastic Materials By means of the above described apparatus and following the process of the present invention, still wet, filter pressed cakes containing 50% by weight of Yellow 13 nr. 21100 pigment were fed continuously into the turbo-mixer A with a flow rate of 100 kg/hr.

The wall temperature of the turbo-mixer was controlled to be around 60° C. and the speed of the rotor provided with blades was constantly at 800 rpm. Contemporaneously, a previously prepared solution containing 50% by weight of medium density polyethylene with softening point of 110–120° C., dissolved in a 1:2 mixture of toluol/benzol, was fed inside the turbo-mixer A through the nozzles 10 and the port 6.

After a residence time in the turbo-mixer A of about 2 minutes, the dye paste which had formed in such turbo-mixer, was fed in continuous into the turbo-dryer B, wherein the wall temperature was controlled to be around 100° C. and the rotational speed of the rotor was maintained at 700 rpm.

In the turbo-dryer B, further on, a continuous flow of nitrogen at a flow rate of 400 $m^3/h$ and at the temperature of 140° C. was fed concurrently with the flow of said dye paste and the vapours generated by drying were intaken together with nitrogen by means of a fan connected to the turbo-dryer B.

After a residence time in the turbo-dryer B of about 4 minutes, a master batch in the form of beads was discharged containing 90% by weight of the aforesaid pigment dispersed in polyethylene, that was sent to the cyclone C in order to be separated from the fine dusts.

The aforesaid mixture had a water content equal to 1% and, without requiring any milling, had a high dispersibility in various styrene, polyolefin plastic materials and block copolymers and could be advantageously used for the pigmentation of such materials.

The process according to the present invention, previously disclosed with reference to the apparatus of the enclosed drawing, resulted particularly efficient for the production of dry master batches in general and including at least an ingredient choosen in the group of pigments previously considered, anti-flame agents, UV and temperature stabilizers, vulcanizing agents, reticulating agents, initiators, viscosity modifiers, anti-flocculating agents and the like and mixtures of the same pigments or agents.

What is claimed is:

1. Dry master batch comprising at least one pigment and a dispersion carrier, wherein the master batch contains at least 80% by weight calculated on the weight of the master batch of particles of granulometry lower than 1 $\mu$m of said at least one pigment dispersed in said carrier.

2. Master batch according to claim 1, characterised by containing at least 90% of particles of said at least one pigment dispersed in said dispersion carrier.

3. Master batch according to claim 1, wherein said dispersion carrier consists of resins chosen in the group comprising glycerophthalic resins and derivatives thereof, polyamide resins, polyvinyl alcohols, colophonies and mixtures thereof.

4. Master batch according to claim 2, wherein said dispersion carrier consists of resins chosen in the group comprising glycerophthalic resins and derivatives thereof, polyamide resins, polyvinyl alcohols, colophonies and mixtures thereof.

5. Master batch according to claim 1, wherein said dispersion carrier is a polyolefin.

6. Master batch according to claim 2, wherein said dispersion carrier is a polyolefin.

7. A method of preparing inks or paints comprising the step of utilizing a dry master batch according to claim 1 in the preparation of inks and paints.

8. A method of preparing inks or paints comprising the step of utilizing a dry master batch according to claim 2 in the preparation of inks and paints.

9. A method of preparing inks or paints comprising the step of utilizing a dry master batch according to claim 3 in the preparation of inks and paints.

10. A method of preparing pigmented plastic materials comprising the step of utilizing a dry master batch according to claim 1 for the pigmentation of plastic materials.

11. A method of preparing pigmented plastic materials comprising the step of utilizing a dry master batch according to claim 2 for the pigmentation of plastic materials.

12. A method of preparing pigmented plastic materials comprising the step of utilizing a dry master batch according to claim 3 for the pigmentation of plastic materials.

13. The method according to claim 10, wherein said plastic materials are chosen from the group comprising materials consisting of styrene, vinyl, polyolefin, polyurethane polymers and block copolymers.

14. The method according to claim 11, wherein said plastic materials are chosen from the group comprising materials consisting of styrene, vinyl, polyolefin, polyurethane polymers and block copolymers.

15. The method according to claim 12, wherein said plastic materials are chosen from the group comprising materials consisting of styrene, vinyl, polyolefin, polyurethane polymers and block copolymers.

16. Process for the production of a dry master batch, comprising at least one ingredient chosen among pigments, anti-flame agents, UV and temperature stabilizers, vulcanizing agents, reticulating agents, initiators, viscosity modifiers, anti-flocculating agents and the like and mixtures of the same pigments or agents, comprising the steps of:

providing a turbo-mixer comprising a cylindrical tubular body, equipped in case with a heating jacket on the inner wall thereof, with at least one inlet opening for said at least one pigment in form of wet cake, with at least one inlet opening for a solution of said dispersant carrier and at least one discharge opening and one rotor provided with blades, rotatably supported in the cylindrical body and having the blades arranged helicoidally;

feeding in continuous and in co-current a flow of said at least one pigment and a flow of solution of said dispersant carrier in the turbo-mixer;

centrifuging said flows against said inner wall, with the formation of a dye paste arranged in a thin tubular, turbulent and dynamic layer that is advanced by the blades of said rotor towards aid at least one discharge opening of said turbo-mixer, said blades subjecting to a severe mechanical machining the dye past of said thin tubular, turbulent and dynamic layer;

discharging in continuous a flow of said dye paste from said at least one discharge opening of said turbo-mixer; and drying said dye paste obtaining said dry master batch.

17. Process according to claim 16, wherein said heating jacket is maintained at a temperature comprised between 20° C. and 60° C.

18. Process according to claim 17, wherein the drying step of said dye paste is carried out at a temperature from 80° C. to 240° C.

19. Process according to claim 18, wherein the drying step of said dye paste is carried out in presence of a flow of an inert gas at a temperature of 120–240° C.

20. Process according to claim 19, wherein said inert gas is nitrogen.

21. Process according to claim 16, wherein said drying of the paste comprises the steps of:

feeding in continuous a flow of the dye paste in outlet from said turbo-mixer into a turbo-dryer, comprising a cylindrical tubular body equipped with a jacket for heating the inner wall thereof, maintained at a temperature of 80–240° C., with at least one inlet opening for said dye paste, with at least one discharge opening for the final master batch and with at least one outlet opening for the vapors released during the drying and with a rotor provided with blades, rotatably supported in the cylindrical body and having helicoidally arranged blades oriented for advancing said dye paste from said at least one inlet opening towards said at least one discharge opening;

centrifuging inside said turbo-dryer said dye paste with formation since its inlet in said turbo-dryer of a thin tubular, turbulent and dynamic layer that is made advance by the blades of the rotor of said turbo-dryer towards said at least one discharge opening thereof, in heat exchange relationship with the wall of said turbo-dryer, said blades subjecting to a severe mechanical machining said dye paste of said thin tubular, turbulent and dynamic layer;

contemporary intaking the vapors that are released from said dye paste; and discharging in continuous a flow of said master batch.

22. Process according to claim 21, wherein the rotor provided with blades of said turbo-dryer is made rotate at a rotational speed of 200–1000 rpm.

23. Process according to claim 21, wherein said turbo-dryer further comprises an opening for the inlet of a continuous flow of inert gas with a flow rate of 400–600 m$^3$/h having a temperature of 120–240° C. in co-current with the continuous flow of said dye paste.

24. Process according to claim 16, wherein said at least one inlet opening for the solution of dispersant carrier consists of nozzles.

25. Process according to claim 16, wherein said at least one inlet opening for the flow of said solution of dispersant carrier consists of a port.

26. Process according to claim 17, wherein the rotor provided with blades of said turbo-dryer is made rotate at a rotational speed of 200–1000 rpm.

27. Process according to claim 16, further comprising a step of removal of fine dusts from said dry master batch.

28. Process according to claim 27, wherein said step of dust removal is carried out in a cyclone.

29. Process for the production of a dry master batch, comprising at least one pigment dispersed in a dispersant carrier, process which comprises the steps of:

providing a turbo-mixer comprising a cylindrical tubular body, equipped in case with a heating jacket on the inner wall thereof, with at least one inlet opening for said at least one pigment in form of wet cake, with at least one inlet opening for a solution of said dispersant carrier and at least one discharge opening and one rotor provided with blades, rotatably supported in the cylindrical body and having the blades arranged helicoidally;

feeding in continuous and in co-current a flow of said at least one pigment and a flow of solution of said dispersant carrier in the turbo-mixer;

centrifuging said flows against said inner wall, with the formation of a dye paste arranged in a thin tubular, turbulent and dynamic layer that is advanced by the blades of said rotor towards said at least one discharge opening of said turbo-mixer, said blades subjecting to a severe mechanical machining the dye paste of said thin tubular, turbulent and dynamic layer;

discharging in continuous a flow of said dye paste from said at least one discharge opening of said turbo-mixer; and drying said dye paste obtaining said dry master batch.

30. Process according to claim 29, wherein said heating jacket is maintained at a temperature comprised between 20° C. and 60° C.

31. Process according to claim 30, wherein the drying step of said dye paste is carried out at a temperature from 80° C. to 240° C.

32. Process according to claim 29, wherein the drying step of said dye paste is carried out in presence of a flow of an inert gas at a temperature of 120–240° C.

33. Process according to claim 32, wherein said inert gas is nitrogen.

34. Process according to claim 16, wherein said drying of the paste comprises the steps of:

feeding in continuous a flow of the dye paste in outlet from said turbo-mixer into a turbo-dryer, comprising a cylindrical tubular body equipped with a jacket for heating the inner wall thereof, maintained at a temperature of 80–240° C., with at least one inlet opening for said dye paste, with at least one discharge opening for the final master batch and with at least one outlet opening for the vapors released during the drying and with a rotor provided with blades, rotatably supported in the cylindrical body and having helicoidally arranged blades oriented for advancing said dye paste from said at least one inlet opening towards said at least one discharge opening;

centrifuging inside said turbo-dryer said dye paste with formation since its inlet in said turbo-dryer of a thin tubular, turbulent and dynamic layer that is made advance by the blades of the rotor of said turbo-dryer towards said at least one discharge opening thereof, in heat exchange relationship with the wall of said turbo-dryer, said blades subjecting to a severe mechanical machining said dye paste of said thin tubular, turbulent and dynamic layer;

contemporary intaking the vapors that are released from said dye paste; and discharging in continuous a flow of said master batch.

35. Process according to claim 34, wherein the rotor provided with blades of said turbo-dryer is made rotate at a rotational speed of 200–1000 rpm.

36. Process according to claim 34, wherein said turbo-dryer further comprises an opening for the inlet of a continuous flow of inert gas with a flow rate of 400–600 $m^3$/h having a temperature of 120–240° C. in co-current with the continuous flow of said dye paste.

37. Process according to claim 29, wherein said at least one inlet opening for the solution of dispersant carrier consists of nozzles.

38. Process according to claim 29, wherein said at least one inlet opening for the flow of said solution of dispersant carrier consists of a port.

39. Process according to claim 29, wherein the rotor provided with blades of said turbo-dryer is made rotate at a rotational speed of 200–1000 rpm.

40. Process according to claim 29, further comprising a step of removal of fine dusts from said dry master batch.

41. Process according to claim 40, wherein said step of dust removal is carried out in a cyclone.

* * * * *